(No Model.)
R. S. PEASE.
MELTING POT.
No. 484,161. Patented Oct. 11, 1892.
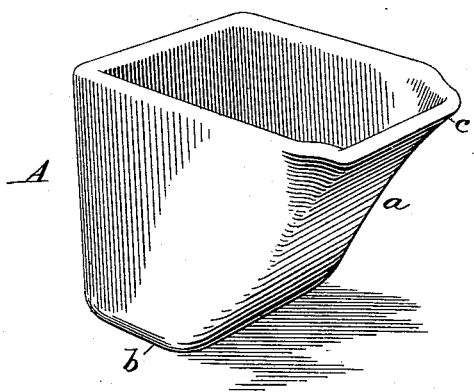
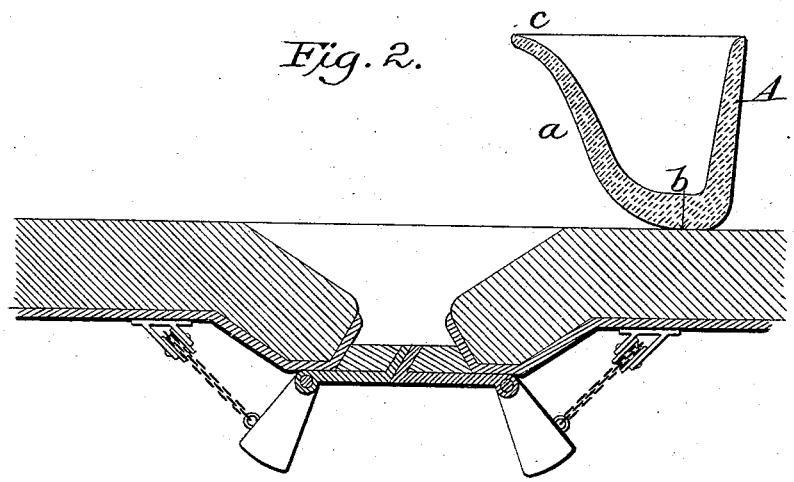
Witnesses:
James F. Duhamel.
Horace A. Dodge.
ROGER S. PEASE,
Inventor.
by Dodger Sons,
Attys.

UNITED STATES PATENT OFFICE.

ROGER S. PEASE, OF ROSE, MINNESOTA.

MELTING-POT.

SPECIFICATION forming part of Letters Patent No. 484,161, dated October 11, 1892.

Original application filed February 11, 1891, Serial No. 381,011. Divided and this application filed September 19, 1891. Serial No. 406,177. (No model.)

*To all whom it may concern:*

Be it known that I, ROGER S. PEASE, a citizen of the United States, residing at Rose, in the county of Ramsey and State of Minnesota, but having my place of business and post-office address at Minneapolis, Minnesota, have invented certain new and useful Improvements in Melting-Pots, of which the following is a specification.

My invention consists in a melting pot or vessel for use in glass-making and designed more particularly for use in connection with the apparatus, and for carrying out the process set forth in a concurrent application, filed February 11, 1891, Serial No. 381,011, of which this is a division.

In the drawings annexed, Figure 1 is a perspective view of my improved pot or vessel, and Fig. 2 a vertical sectional view of the same.

The purpose of my invention is to produce a pot or vessel which may be readily tipped to discharge its contents, held at any desired angle, and caused to deliver its charge in a broad sheet quickly and without trickling, as in the case of a pot with a narrow spout.

In the drawings, A indicates the pot or vessel as a whole, made of refractory material and having a curved or inclined front $a$, a flat bottom $b$, and a pouring-lip $c$.

As shown in Fig. 1, the front side of the pot or vessel is rounded or cut away to such an extent that a very slight pressure forward will cause the pot to tip and discharge its contents, and so, too, that the movements of the pot may be easily controlled throughout, the rounded, rocking, or bearing faces permitting the easy control and tipping of the pot to any extent desired. Sufficient flat surface or bearing $b$ is left for the pot to stand upon normally.

It is feasible to cut away the front of the pot to such an extent that it shall be unable to stand alone upon a plane surface and to block it up or otherwise hold it against tipping until occasion therefor arises.

In actual practice there is always present upon the floor of the furnace or melting-chamber more or less molten glass or metal, due to spilling in handling, &c., and this being a viscous substance will serve to retain in upright position a pot which would otherwise be incapable of standing without props or locking devices. For this reason I do not wish to restrict myself to any precise curve, nor to an exact tipping point, though I prefer a sufficient bearing-bottom to enable the pot to stand alone. This peculiar formation of the pot is important to the practical carrying out of my improved method, because of the necessity of tipping the pots within the heating or melting chamber, and, further, because it is essential that the contents be discharged in a mass and not allowed to drip or trickle from the pot, because such slow discharge causes the molten metal to fold upon itself and to inclose bodies of air which form bubbles in the sheet rolled therefrom.

Having thus described my invention, what I claim is—

1. The herein-described pot or vessel, formed in one integral body of refractory material and having its front face cut away toward the bottom, substantially as described and shown, whereby it is adapted to be used within a glass furnace or oven and to be readily tipped to and held at any desired inclination.

2. The herein-described pot, formed of refractory material with a flat bottom and flat front side and having its front face rounded or cut away toward the bottom, substantially as shown, whereby the pot is adapted to be readily tipped and held in any desired position.

In witness whereof I hereunto set my hand in the presence of two witnesses.

ROGER S. PEASE.

Witnesses:
    M. B. PULLEN,
    M. S. EVERTS.